United States Patent
Wang et al.

(10) Patent No.: US 9,752,020 B2
(45) Date of Patent: Sep. 5, 2017

(54) RUBBER COMPOSITION HAVING GOOD WET-TRACTION PROPERTIES AND A LOW AROMATIC-OIL CONTENT

(75) Inventors: Xiaorong Wang, Hudson, OH (US); James E. Hall, Mogadore, OH (US)

(73) Assignee: Bridgestone Corporation, Chuo-ku (JP)

(*) Notice: Subject to any disclaimer, the term of this patent is extended or adjusted under 35 U.S.C. 154(b) by 644 days.

(21) Appl. No.: 11/646,981

(22) Filed: Dec. 28, 2006

(65) Prior Publication Data

US 2007/0149689 A1 Jun. 28, 2007

Related U.S. Application Data

(60) Provisional application No. 60/754,389, filed on Dec. 28, 2005.

(51) Int. Cl.
| | | |
|---|---|---|
| *C08L 21/00* | (2006.01) | |
| *C08L 51/06* | (2006.01) | |
| *C08L 23/22* | (2006.01) | |
| *C08L 23/26* | (2006.01) | |
| *B60C 1/00* | (2006.01) | |
| *C08F 8/32* | (2006.01) | |
| *C08F 255/10* | (2006.01) | |
| *C08K 3/00* | (2006.01) | |
| *C08K 5/01* | (2006.01) | |
| *C08K 5/00* | (2006.01) | |
| *C08F 222/06* | (2006.01) | |
| *C08F 210/10* | (2006.01) | |

(52) U.S. Cl.
CPC ............ *C08L 21/00* (2013.01); *B60C 1/0016* (2013.04); *C08F 8/32* (2013.01); *C08F 210/10* (2013.01); *C08F 222/06* (2013.01); *C08F 255/10* (2013.01); *C08L 51/06* (2013.01); *C08K 3/0033* (2013.01); *C08K 5/0008* (2013.01); *C08K 5/01* (2013.01); *C08L 23/22* (2013.01); *C08L 23/26* (2013.01); *C08L 2666/02* (2013.01); *C08L 2666/04* (2013.01); *C08L 2666/06* (2013.01)

(58) Field of Classification Search
CPC .......... C08L 21/00; C08L 51/06; C08L 23/22; C08L 23/26; C08L 2666/06; C08L 2666/04; C08L 2666/02; B60C 1/0016; C08F 8/32; C08F 255/10; C08F 222/06; C08F 210/10; C08K 3/0033; C08K 5/01; C08K 5/0008
USPC ...................................................... 524/493
See application file for complete search history.

(56) References Cited

U.S. PATENT DOCUMENTS

| | | |
|---|---|---|
| 3,018,291 A | 1/1962 | Anderson et al. |
| 3,024,237 A | 3/1962 | Drummond et al. |
| 3,172,892 A | 3/1965 | Le Suer et al. |
| 3,219,666 A | 11/1965 | Norman et al. |
| 3,223,495 A | 12/1965 | Calvino et al. |
| 3,272,746 A | 9/1966 | Le Suer et al. |
| 3,361,673 A | 1/1968 | Stuart et al. |
| 3,367,864 A | 2/1968 | Elliott et al. |
| 3,443,918 A | 5/1969 | Kautsky et al. |
| 3,461,108 A | 8/1969 | Heilman et al. |
| 3,560,455 A | 2/1971 | Hazen et al. |
| 3,560,456 A | 2/1971 | Hazen et al. |
| 3,560,457 A | 2/1971 | Hazen et al. |
| 3,580,893 A | 5/1971 | Heilman |
| 3,706,704 A | 12/1972 | Heilman |
| 3,729,450 A | 4/1973 | Galiano et al. |
| 3,729,451 A | 4/1973 | Blecke et al. |
| 3,836,511 A | 9/1974 | O'Farrell et al. |
| 3,912,764 A | 10/1975 | Palmer, Jr. |
| 3,944,552 A | 3/1976 | Lawrence |
| 4,152,499 A | 5/1979 | Boerzel et al. |
| 4,234,435 A | 11/1980 | Meinhardt et al. |
| 4,322,336 A | 3/1982 | Machurat et al. |
| 4,410,437 A | 10/1983 | Erdman |
| 4,446,281 A * | 5/1984 | Takamatsu et al. .......... 525/282 |
| 4,910,267 A | 3/1990 | Oyama et al. |
| 5,112,507 A | 5/1992 | Harrison |
| 5,137,978 A | 8/1992 | Degonia et al. |
| 5,137,980 A | 8/1992 | Degonia et al. |
| 5,150,754 A | 9/1992 | Phelps et al. |
| 5,175,225 A | 12/1992 | Ruhe, Jr. |
| 5,286,799 A | 2/1994 | Harrison et al. |
| 5,319,030 A | 6/1994 | Harrison et al. |
| 5,393,309 A | 2/1995 | Cherpeck |
| 5,523,417 A | 6/1996 | Blackborow et al. |

(Continued)

FOREIGN PATENT DOCUMENTS

| | | | |
|---|---|---|---|
| EP | 0355895 | 2/1990 | |
| EP | 0542380 | 5/1993 | |
| EP | 0602863 | 6/1994 | |
| EP | 1270657 | 1/2003 | |
| EP | 1803771 | 7/2007 | |
| JP | 59008737 A | 1/1984 | |
| JP | 61073749 A | 4/1986 | |
| JP | 10193911 A | 7/1998 | |
| WO | 2004/058874 | 7/2004 | |
| WO | WO 2004058874 A1 * | 7/2004 | ............... C08K 9/04 |
| WO | 2007070063 | 6/2007 | |

OTHER PUBLICATIONS

Article, V. Trappe & D.V. Weitz., PRL, 85(2) 449 (2000).

(Continued)

*Primary Examiner* — Angela C Scott
(74) *Attorney, Agent, or Firm* — Meredith E. Hooker; Nathan T. Lewis

(57) ABSTRACT

This invention relates to rubber compositions having a low aromatic-oil content, or no aromatic oils at all. The rubber composition contains a diene rubber, one or more fillers, and a low molecular weight, functionalized polymer than has the ability to interact with the fillers and act and as a replacement to the aromatic oil. The rubber compositions so produced may be used in tread rubbers and have exhibited good snow/wet traction properties and low rolling resistance.

20 Claims, 3 Drawing Sheets

(56) References Cited

U.S. PATENT DOCUMENTS

| | | | |
|---|---|---|---|
| 5,565,528 | A | 10/1996 | Harrison et al. |
| 5,616,668 | A | 4/1997 | Harrison et al. |
| 5,625,004 | A | 4/1997 | Harrison et al. |
| 5,777,025 | A | 7/1998 | Spencer et al. |
| 5,792,729 | A | 8/1998 | Harrison et al. |
| 5,916,961 | A * | 6/1999 | Hergenrother et al. ...... 524/572 |
| 5,922,792 | A | 7/1999 | Wideman et al. |
| 5,972,852 | A | 10/1999 | Robson |
| 5,972,853 | A | 10/1999 | Boffa et al. |
| 5,981,662 | A | 11/1999 | D'Sidocky et al. |
| 6,133,354 | A | 10/2000 | Wang et al. |
| 6,174,989 | B1 | 1/2001 | D'Sidocky et al. |
| 6,204,354 | B1 | 3/2001 | Wang et al. |
| 6,207,763 | B1 | 3/2001 | Wang et al. |
| 6,350,800 | B1 | 2/2002 | Wang et al. |
| 6,353,054 | B1 | 3/2002 | Wang et al. |
| 6,359,064 | B1 | 3/2002 | Wang et al. |
| 6,369,166 | B1 | 4/2002 | Wang et al. |
| 6,372,855 | B1 | 4/2002 | Chino et al. |
| 6,384,134 | B1 | 5/2002 | Hall et al. |
| 6,401,776 | B1 | 6/2002 | Wang et al. |
| 6,403,724 | B1 | 6/2002 | Wang |
| 6,417,259 | B1 | 7/2002 | Wang et al. |
| 6,458,881 | B1 | 10/2002 | Pan et al. |
| 6,632,781 | B2 | 10/2003 | Harrison et al. |
| 6,699,813 | B2 | 3/2004 | Luo et al. |
| 6,706,823 | B2 | 3/2004 | Wang et al. |
| 7,429,393 | B2 | 9/2008 | Wang et al. |
| 2002/0188064 | A1 | 12/2002 | Wang et al. |
| 2003/0130398 | A1 | 7/2003 | Wang |
| 2003/0130401 | A1 | 7/2003 | Lin et al. |
| 2005/0022915 | A1 | 2/2005 | Bowen et al. |
| 2008/0153972 | A1 | 6/2008 | Wang et al. |

OTHER PUBLICATIONS

Bauer, Walter H. et al., "Flow Properties and Structure of Peptized Aluminum Soap-Hydrocarbon Gels", J. Phys. Chem., vol. 62, pp. 106-110 [Jan. 1958].

Bauer, Walter H. et al., "Entrance Effects in Capillary Flow of Aluminum Dilaurate-Toluene Gels", J. Phys. Chem., vol. 62, pp. 1245-1247 [Oct. 1958].

Gaskins, Frederick H. et al., "Rheology of Aluminum Dilaurate in Toluene", Transactions of the Society of Rheology, vol. 13, No. 1, pp. 17-38 [1969].

Harple, Warren W. et al., "Infrared Absorption Spectra of Aluminum Soaps", Analytical Chemistry, vol. 24, No. 4, pp. 635-638 [Apr. 1952].

Ludke, Willard O. et al., "Mechanism of Peptization of Aluminum Soap-Hydrocarbon Gels Based Upon Infrared Studies", J. Phys. Chem., vol. 59, pp. 222-225 [Mar. 1955].

McGee, Charles G., "Aluminum Monolaurate and Proposed Structures for Aluminum Soaps", Am. Chem. Soc., vol. 71, pp. 278-282 [Jan. 1949].

Mysels, Karol J., "Studies of Aluminum Soaps: IX. Electron Microscope View of Lyophilized Aluminum Laurate", The Journal of General Physiology, pp. 159-161 [Jul. 15, 1946].

Weber, Neill et al., "Flow Properties of Aluminum Dilaurate-Toluene Gels", J. Phys. Chem., vol. 60, pp. 270-273 [Mar. 1956].

Weill, J. et al., "Reaction du Polyisobutene Chlore Sur L'Anhydride Maleique: Mecanisme; Catalyse Par L'Anhydride Dichloromaleique", Revue de L'Institut Francais due Petrole, vol. 40, No. 1, pp. 77-89 [Jan.-Feb. 1985].

Admasu, Atnaf S., Office Action dated Jan. 21, 2009 from U.S. Appl. No. 11/615,659 (10 pp.).

Admasu, Atnaf S., Final Office Action dated Aug. 18, 2009 from U.S. Appl. No. 11/615,659 (8 pp.).

Admasu, Atnaf S., Advisory Action dated Nov. 10, 2009 from U.S. Appl. No. 11/615,659 (8 pp.).

Mohajer, Y. et al., "New Polyisobutylene-Based Model Elastomeric Ionomers", Applied Polymer Science, vol. 29, No. 6, pp. 1943-1950 (1984).

Kim, Gye Sook, International Search Report from PCT/US2009/048834, 4 pp. (Feb. 2, 2010).

Yonemura, Koichi, Notification of Reasons for Refusal, Japan Patent Office, re. Application No. JP 2006-352814, Aug. 7, 2012.

Mettler, Rolf-Martin, Office Action, European Patent Office, re. Application No. 06,256,456, Oct. 25, 2011.

Yonemura, Koichi, English translation of Apr. 24, 2012 Office Action from Japanese Patent Application No. 2006-352814 (3 pp.).

* cited by examiner

RUBBER COMPOSITION HAVING GOOD WET-TRACTION PROPERTIES AND A LOW AROMATIC-OIL CONTENT

CROSS-REFERENCE

This application claims the benefit of U.S. Provisional Application No. 60/754,389, Filed Dec. 28, 2005, which is incorporated herein by reference.

FIELD OF THE INVENTION

This invention relates to rubber compositions having a low aromatic-oil content. In particular, this invention relates to diene rubber compositions wherein part of the aromatic oil may be replaced with a low molecular weight, liquid, functionalized polymer. The rubber compositions may be used in a variety of commercial products, such as tread rubbers.

BACKGROUND OF THE INVENTION

Rubber compositions traditionally are made with aromatic oil, which enables the rubber compositions to be more easily processed. Additionally, when the rubber composition is used in a tread rubber, the aromatic oil provides the tread rubber with improved traction. However, some European countries have passed regulations to limit the amount of aromatic oils used in the rubber compositions. Substitutes for aromatic oil, such as synthetic ester oils and hydrogenated aromatic oils, do not provide the same beneficial properties imparted by aromatic oils.

Thus, what is needed in the art is a rubber composition that contains low amounts of aromatic oils or no aromatic oils while nonetheless enables the rubber composition to exhibit many of the beneficial properties provided by the aromatic oil. This invention answers that need.

BRIEF SUMMARY OF THE INVENTION

This invention relates to a stable rubber composition having a low aromatic-oil content, containing (a) a diene rubber, (b) one or more fillers, and (c) a low molecular weight, functionalized polymer, wherein the rubber composition has an aromatic-oil content of 15 or fewer parts oil per 100 parts rubber.

The invention also relates to a tread rubber composition, containing: (a) a diene rubber, (b) a functionalized filler, and (c) a low molecular weight, functionalized polymer, wherein the functionalized polymer interacts with the functionalized filler.

The invention also relates to a method of producing a tread rubber having improved wet-traction properties. The method comprises (a) preparing a rubber composition containing a diene rubber, one or more fillers, and a low molecular weight, functionalized polyisobutylene polymer; and (b) vulcanizing the rubber composition, to produce a tread rubber having improved wet-traction properties.

DETAILED DESCRIPTION OF THE INVENTION

Figure 1:
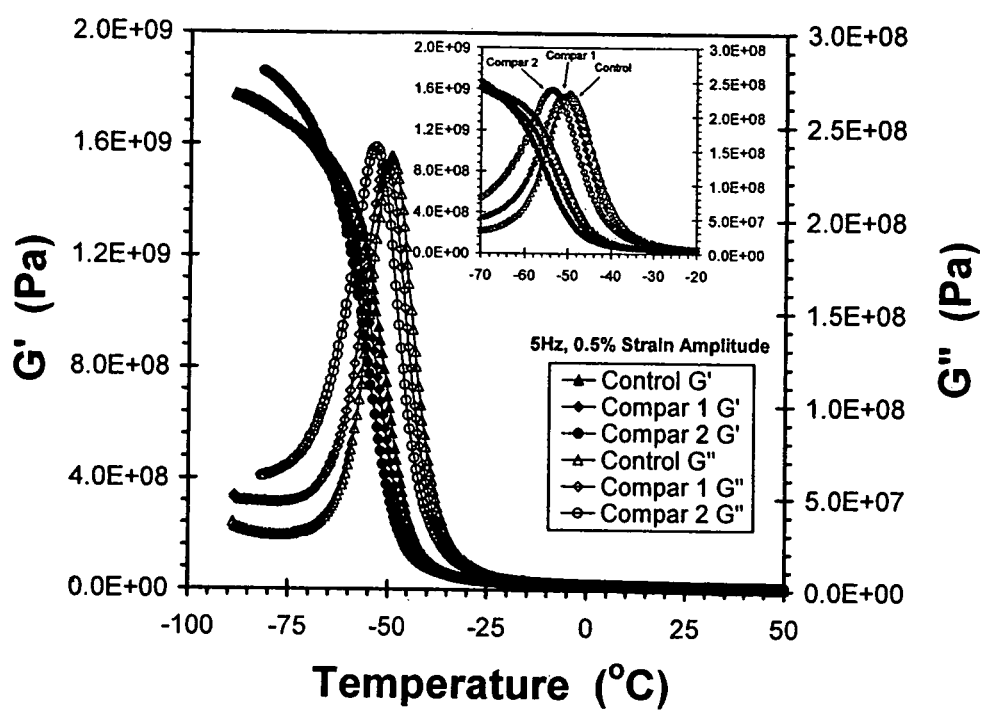
FIG. 1 shows a temperature-scan graph comparing G' and G" values of rubber compositions over temperatures ranging from −100° C. to 50° C. The smaller graph shown inside the larger graph focuses on temperatures ranging from −70° C. to −20° C.

This invention relates to a stable rubber composition having a low aromatic-oil content, containing (a) a diene rubber, (b) one or more fillers, and (c) a low molecular weight, liquid, functionalized polymer, wherein the rubber composition has an aromatic-oil content of 15 or fewer parts oil per 100 parts rubber.

The low molecular weight functionalized polymer may be represented by any polymer that contains a functionalized group on at least one chain end. Suitable polymers include polyethylene, polypropylene, polybutylene, polyisobutylene, and polyisoprene. Preferably, the polymer is polyisobutylene or polybutylene, as butyl polymers have demonstrated good wet traction properties when used in, e.g., tread rubbers.

The molecular weight of the low molecular weight polymer typically ranges from about 100 to about 50,000. Preferably, the molecular weight ranges from about 1000 to about 5000. Most preferably, the molecular weight ranges from about 1000 to about 1300.

The polymer is preferably in a liquid state at 23° C. Having the polymer in a liquid state allows the polymer to more easily mimic the physical characteristics of the aromatic oil, which is typically present in a liquid state at 23° C.

The polymer should be functionalized on at least one chain end. Besides the chain ends, the polymer may also contain functional groups at various points along the polymer backbone. Having multiple functional groups promotes crosslinking and increases the amount of possible interactions with other components in the composition, such as the filler.

Any functional group may be present on the polymer. Suitable functional groups include hydroxyl, carboxyl, carbonyl, alkoxy, alkoxycarbonyl, cyano, amino, amido, imido, mercapto, carbamoyl, azido, ester, ether, urethane, peroxide, imidazolyl, and pyridine groups, as well as derivatives of those groups. When the polymer contains multiple functional groups, the same functional group may be present in the polymer, or different functional groups may be present. The functionalized polymer has the ability, through the functional group, to interact with other compounds containing a functional group, such as silica.

Functionalizing the polymer additionally provides the polymer with the ability to overcome many of the setbacks incurred by introducing non-functionalized polymers into the rubber composition. Non-functionalized polymers, such as non-functional butyl polymers, may be immiscible with the diene rubbers of the rubber composition. Attempting to blend immiscible components through typical mechanical blending procedures often results in stocks that are unstable, exhibit phase separation, bleed, and have poor tensile-strength properties. Functionalized polymers that can interact with, for example, a functionalized filler, are not immiscible with the diene rubbers and thus do not exhibit many of the drawbacks described above.

A functionalized polymer is a polymer that has taken on functionality imparted by the functional group. For instance, if a polymer is functionalized with an anhydride group, the polymer will then be considered an anhydride-functionalized polymer; likewise, if a polyisobutylene polymer is functionalized with succinic anhydride, the resulting polymer will be considered an anhydride-functionalized polyisobutylene.

Functionalized polymers may be prepared by reacting the monomer units of the desired polymer with the functional group. For instance, an anhydride-functionalized polyisobutylene may be prepared by reacting an isobutylene monomer with a maleic anhydride monomer. The amount of isobutylene units and maleic anhydride units will vary depending on the desired functionality of the resulting polymer. Typically, maleic anhydride units will range from about 5 to 99 mole percent and the isobutylene units will range from 1 to 95 mole percent. The co-monomers, in this case maleic anhydride and isobutylene, can be randomly or alternatingly distributed in the chain. It may be preferable to have the co-monomers alternating along the polymer backbone chain thus producing more functionality in the polymer. This, in turn, provides greater ability for the functionalized polymer to interact with the filler, which is a preferred feature of the functionalized polymer.

Alternatively, a functionalized polymer may be purchased commercially if available. Polyisobutylene succinic anhydride, a preferred functionalized polymer, is commercially available from, for example, Chevron Chemicals under the trade name OLOA 15500.

The functional group of the polymer may be further functionalized by reacting the functional group with a compound that has the ability to impart a different functionality to the polymer. For instance, the anhydride-functionalized polyisobutylene may be further functionalized by reacting the polymer with another compound such as an amine. As is well known in the art, when a primary amine reacts with an anhydride, an imide is formed in an imidization reaction. See U.S. Pat. No. 6,133,354, herein incorporated by reference in its entirety. Thus, reacting the anhydride-functionalized polymer with an amine will produce an imide-functionalized polymer. If the starting monomer is isobutylene, then the imide-functionalized polymer will be an imide-functionalized polyisobutylene, which is a preferred functionalized polymer. Of course, an amine can be reacted with other functional polymers, just as other compounds besides amines may be reacted with the functional polymer.

The amine is preferably a primary amine that contains a functionalized group. It should be noted that alkyl amines, while containing no additional functional group, are also acceptable provided that some functionality remain on the polymer post reaction. A preferred amine has the formula $H_2N-(CH_2)_x-A$, where x is an integer ranging from 0-60, and A is a functional group. Suitable functional groups include hydroxyl, carboxyl, carbonyl, alkoxy, alkoxycarbonyl, cyano, amino, amido, imido, mercapto, carbamoyl, azido, ester, ether, urethane, peroxide, imidazolyl, and pyridine groups, as well as derivatives of those groups. Preferably, x ranges from 1-18, and more preferably from 1-6. While the $CH_2$ linking chain represents a straight-chain, unsaturated alkylene group connecting the amine with the functional group, the linking chain may be also present a substituted and/or branched alkylene group. The functional group on the amine is preferably a secondary amino group. Most preferably, the amine is 3-(dimethylamino)propylamine.

The imide-functionalized polyisobutylene will carry both the imide functionality and the functionalized group imparted by the amine. If 3-(dimethylamino)propylamine is reacted with the anhydride-functionalized polyisobutylene, the resulting functionalized polymer will carry both the imide and amido functionalities. Such a functionalized polymer is preferred because of its increased ability to interact with the filler in the rubber composition.

The reaction between an anhydride-functionalized polymer and an amine to form the imide-functionalized polymer is preferably carried out at a temperature ranging from room temperature to about 300° C., under substantially dry conditions. The reactants are preferably mixed in their solid state, i.e., dry mixed in the absence of solvents in a suitable mixing apparatus including an internal mixer such as a Brabender mixer or twin-screw extruder. The mixer is preferably purged with a non-reactive gas such as $N_2$ nitrogen prior to charging the reactants. Reaction time typically ranges from 10 minutes to 10 hours, with vigorous mixing preferably occurring for at least one hour. The amine may be added in a single charge or in sequential partial charges into the reactor containing anhydride-functionalized polymer. Preferably the amine is charged in a ratio between 0.8 to 1.0 moles of amine per units derived from the anhydride of the anhydride-functionalized polymer. It is believed that a chemical reaction occurs when a substantial temperature increased is observed, for example, a temperature increase from 23° to 65° C. After the reaction occurs, the material may be dehydrated in a vacuum under dehydration conditions, for instance, at temperatures of 100° C. or above for 12 or more hours.

Other suitable methods include melt mixing, which includes mixing and dynamically heat-treating the components, and other known methods in the art. Conventional equipment for mixing the components, such as an open-type mixing roll, closed-type Banbury mixer, closed type Brabender mixer, extruding machine, kneader, continuous mixer, etc., is acceptable. The closed-type Brabender mixer is preferred, and mixing in an inactive gas environment, such as $N_2$ or Ar, is also preferred.

The functionalized polymer may be used to replace the aromatic oil that is typically used in rubber compositions. Aromatic oils commonly used in rubber compositions include asphalt oils, naphthalene oils, petroleum greases, etc. However, these aromatic oils, as discussed above, are the subject of certain usage regulations. The functionalized polymer thus represents a replacement for the aromatic oil. Additionally, the functionalized polymer imparts beneficial properties to the rubber composition, such as hardness of the rubber composition, that were provided by the aromatic oil.

The functionalized polymer may be added as an additive or as a dispersant to a rubber composition in an amount ranging from about 1 to 200 parts by weight of the functionalized polymer per 100 parts by weight of the rubber; preferably in an amount ranging from about 1 to 100 parts by weight of functionalized polymer per 100 parts by weight of the rubber; more preferably from about 10 to 50 parts of functionalized polymer per 100 parts of the rubber; and most preferably from about 15 to 30 parts of functionalized polymer per 100 parts of the rubber.

The use of a functionalized polymer allows the aromatic-oil content to be substantially reduced in rubber compositions. While the aromatic-oil content can typically range from 30 parts or more per 100 parts rubber, the use of a functionalized polymer allows the aromatic-oil content to drop to about 15 parts or fewer per 100 parts rubber. Preferably, the aromatic-oil content ranges from about 0-15 parts per 100 parts rubber; more preferably, the aromatic-oil content ranges from about 0-10 parts per 100 parts rubber; and most preferably, the aromatic-oil content is at about zero parts per 100 parts rubber. When the aromatic-oil content is at or about zero parts per 100 part rubber, the rubber composition effectively contains no aromatic oil.

It is generally easiest to reduce the aromatic-oil content by the same number of parts that the functionalized polymer is being added. That is, if the aromatic oil content is being reduced 15 parts, from 30 parts to 15 parts, then 15 parts functionalized polymer may be added to replace the aromatic oil. However, this amount of the aromatic-oil content being removed does not have to equal the amount of functionalized polymer added. This is especially true if, for instance, the goal is not to reduce the aromatic-oil content but only to improve the wet-traction properties of the resulting tire composition. In that case, the functionalized polymer may be added without reducing, or only minimally reducing, the aromatic-oil content.

Figure 2:
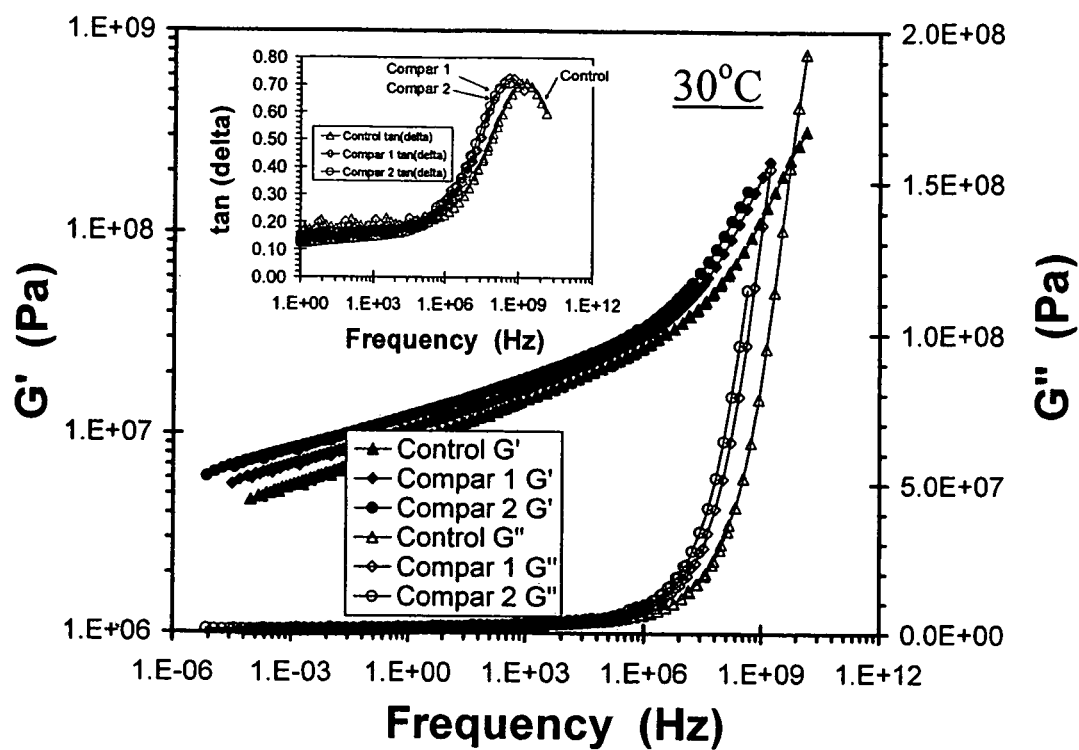
FIG. 2 shows a frequency-scan graph comparing G' and G" values of rubber compositions at 30° C. over frequencies ranging from $1.0E^{-06}$ to $1.0E^{+12}$ Hz. The smaller graph shown inside the larger graph focuses on frequencies ranging from 1.0 to $1.0E^{+12}$ Hz.
Figure 3:
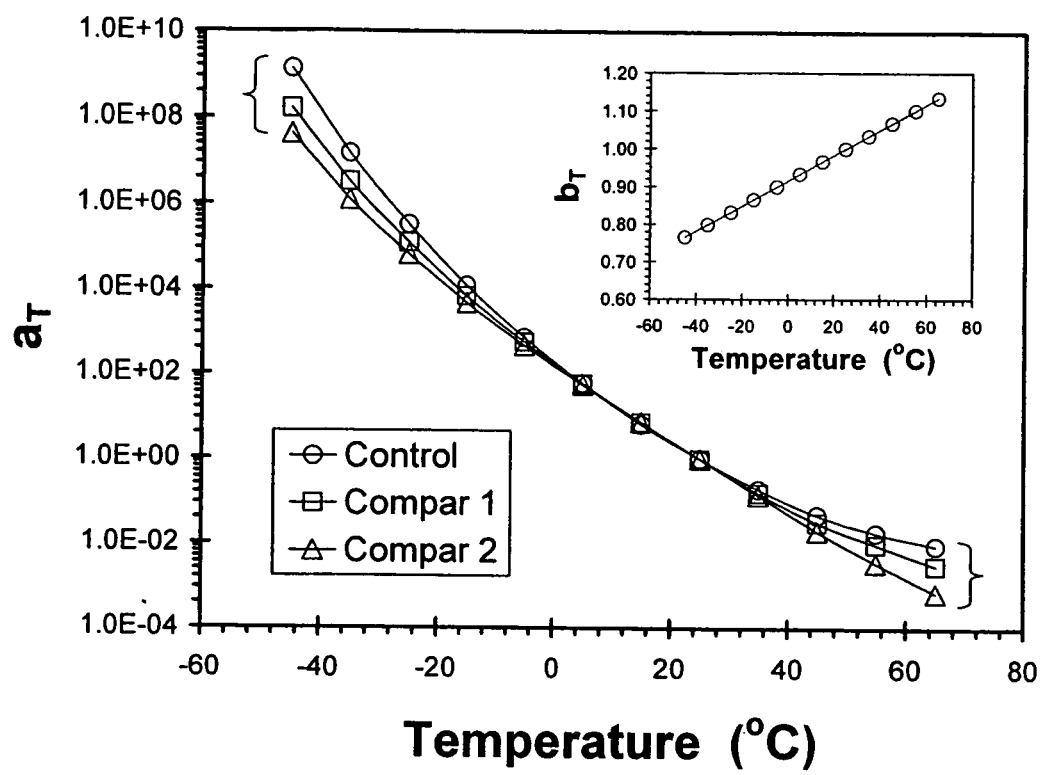
FIG. 3 shows a shifting-factor graph comparing $a_T$ values of rubber compositions; i.e., values that measure frequency-shifting factors, over temperatures ranging from −60° C. to 80° C. The smaller graph shown inside the larger graph compares $b_T$ values of a rubber composition; i.e., values that measure density-shifting factors, over temperatures ranging from −60° C. to 80° C.

The use of functionalized polymers as dispersants for rubber compositions, either alone or as a partial or total aromatic-oil substitute, increases the wet-traction properties of the rubber composition over comparable rubber compositions utilizing aromatic oils. In particular, rubber compositions utilizing the functionalized polymer as a partial or total replacement for the aromatic oil have exhibited (a) lower dynamic shear modulus (G') and higher loss modulus (G") at low temperatures (see FIGS. 1 and 2), and (b) relaxation times (T) that are less sensitive to temperature changes (see FIG. 3), all of which indicate that better snow and wet tractions have been achieved. Rubber compositions containing the functionalized polymer as a partial or total replacement for the aromatic oil have also demonstrated similar Shore A values, indicating a comparable hardness of material.

Thus, an aspect of the invention is directed towards a method of producing a tire having improved wet-traction properties. The method comprises (a) preparing a rubber composition containing a diene rubber, one or more fillers, and a low molecular weight, functionalized polyisobutylene polymer; and (b) vulcanizing the rubber composition, to produce a tire having improved wet-traction properties.

Diene rubbers may be compatibly blended or extended with the functionalized polymer. As known in the art, a diene rubber is the polymerization product of a diene monomer, optionally polymerized with an aromatic monomer. Suitable diene monomers include conjugated dienes having from about 4 to about 12 carbon atoms. Preferred conjugated dienes include 1,3-butadiene, isoprene, 1,3-pentadiene, 2,3-dimethyl-1,3-butadiene, and myrcene. Most preferably, the diene monomer is a butadiene. Suitable aromatic monomers include monovinyl aromatic monomers containing 8 to 18 carbon atoms, such as styrene, α-methyl styrene, p-methyl styrene, and vinyl naphthalene. Preferably, the additional monomer is styrene. When the diene monomer is butadiene and the aromatic monomer is styrene, the diene rubber is a butadiene-styrene polymer. The butadiene-styrene polymer is a rubbery polymer that is commonly used in the industry for various components that utilize rubber. Butadiene-styrene polymers and other rubbery polymer represent the preferred diene rubbers. When preparing a diene rubber, such as those containing conjugated diene monomers and aromatic vinyl monomers, the conjugated diene monomers and aromatic vinyl monomers are normally used at a ratio of 95:5 to 50:50, and preferably 95:5 to 65:35.

The diene rubber may be prepared according to conventional or common methods or processes well known to those skilled in the art. Generally, an emulsion process, an anionic polymerization process, or a free-radical process wherein the diene monomer is soluble in a solvent may be utilized. The rubber may also be prepared utilizing an anionic polymerization with various commonly employed catalysts such as organolithium compounds.

The filler may be any filler known in the art that has the ability to interact with the functional group of the functionalized polymer. This interaction preferably takes place through the functional group of the filler interacting with the functional group of the functionalized polymer. Fillers that contain functionalized groups, i.e., functionalized fillers, are therefore preferred. Exemplary fillers include silica, alumina, mineral fillers such as clays, including hard clays, soft clays, and chemically modified clays, volcano ashes, mica, talc (magnesium silicate), $CaCO_3$, $TiO_2$, ground coal, ground and/or reclaimed rubber, and mixtures thereof. Silica and alumina are examples of functionalized fillers that have a strong ability to interact with the functionalized polymers and therefore represent the most preferred fillers.

Fillers such as carbon black, on the other hand, while useful as fillers and may be included in rubber compositions containing functionalized polymers, do not contain functional groups or other features that would allow the filler to interact with the functionalized polymer. Without some type of interaction between the filler and polymer, it is believed that the polymer, being generally immiscible with diene rubbers, will exhibit phase separation, bleeding, and result in an unstable composition. When the compositions are used in tread rubbers, they will lead to tread rubbers having relatively poor mechanical-strength properties.

Accordingly, an aspect of this invention relates to a tread rubber composition, containing: (a) a diene rubber, (b) a functionalized filler, and (c) a low molecular weight, liquid, functionalized butyl polymer, wherein the functionalized polymer interacts with the functionalized filler.

It is frequently desirable to include other compounding ingredients well known in the rubber art to the rubber compositions. Typical compounding ingredients are additives, such as antioxidants, stabilizers, curing agents, sulfur, accelerators, and retarders. Specific examples of useful antioxidants and stabilizers include 2-(2'-hydroxy-5'-methylphenyl)benzotriazole, nickel dibutyldithiocarbanate, zinc dibutyl dithiocarbamate, tris(nonylphenyl)phosphite, 2,6-di-t-butyl-4-methylphenol and the like. These compounding ingredients are incorporated in suitable amounts depending upon the contemplated use of the product, preferably in the range of 1 to 350 parts of additives or compounding ingredients per 100 parts of the rubber. Standard rubber mixing equipment and procedures may be used when adding the compounding ingredients.

The rubber compositions may be prepared by any means well known in the art for combining such ingredients, such as solution blending, milling, internal batch mixing, or continuous extrusion of the functionalized polymer, diene rubber, filler, and the other ingredients. A rapid and convenient method of preparation comprises heating a mixture of the components to a temperature of about 50° C. to about 290° C. The blended compositions can be mixed in any conventional mixer such as a Banbury mixer or roll mill or extruder normally conducted within the temperature range of about 70° C. to about 300° C., preferably maintaining the composition above its melting point for a few minutes up to several hours, preferably 5 to 40 minutes.

The rubber compositions can be used in all industry fields, in particular, in the fabrication of automotive parts, tires, tire tread rubbers, household electrical appliances, industrial machinery, precision instruments, transport machinery, constructions, engineering, medical instruments and tire rubber formulations. The rubber composition can also be used to form other tire components such as subtreads, black sidewalls, body ply skims, bead fillers and the like. When prepared as a tire or a tire component, the rubber composition may be vulcanized in accordance with known vulcanization techniques used to produce tires and tire components.

The practice of the invention is further illustrated by the following examples, which should not be construed as limiting the scope of the invention as recited in the claims.

EXAMPLES

Example 1: Preparation of Polyisobutylene Imide 211 g of polyisobutylene succinic anhydride (Mw: 1900; Mn: 1000; 95 meq of COOH/100 g; purchased from Chevron Chemicals under the name OLOA 15500) and 10.24 g of 3-(dimethylamino)propylamine (purchased from Aldrich) were charged into a dry 1.5 L bottle. The two materials were mixed vigorously for one hour. The temperature of the mixture increased from 23° C. to 65° C., indicating that a chemical reaction has occurred. After the reaction had completed, the composition was allowed to cool at room temperature for 4 hours. The composition was then placed in a vacuum oven at 110° C. for 20 hours so that the composition would dehydrate. The final product was observed to be a brownish, viscous liquid. Testing by infrared spectra analysis confirmed that the final product was polyisobutylene imide.

Example 2 (Comparative Example)

The following components were mixed in 300 g Brabender mixer at an agitation speed of 60 rpms, having an initial temperature of 110° C. The amounts listed are based on 100 parts rubber.

| Component | Amount |
|---|---|
| Styrene-butadiene rubber[1] | 100 |
| Precipitated silica filler[2] | 70.0 |
| Aromatic oil[3] | 30.0 |
| Paraffin Wax[4] | 1.50 |
| Steric Acid[5] | 2.00 |
| Santoflex 13 (antioxidant)[6] | 0.95 |
| Si 69 (silane coupling agent)[7] | 8.00 |

[1]23.5% styrene, solution polymerized, Mooney viscosity at 100° C. = 55, 11% vinyl content; available from Firestone Synthetic (Akron, OH)
[2]Purchased from PPG (Pittsburgh, PA) as hydrate amorphous silica
[3]Purchased from Mobil (Fairfax, VA) under the trade name Mobilsol 90
[4]Purchased from Aston Wax Corp. (Tilusville, PA)
[5]Purchased from Sherex Chemical (Dublin, OH)
[6]Chemical name: N-(1,3-dimethylbutyl)-N'-phenyl-P-phenylene-diamine; purchased from Monsanto (St. Louis, MO) under the trade name 6PPD
[7]Chemical name: bis-(3-triethoxy-silyl propyl) tetrasulfide; purchased from Degussa (Parsippany, NJ)

Master batch stage: At time zero, the styrene-butadiene rubber was charged to the mixer and heated to an initial temperature of 110° C. The remaining components were added at t=0.5 min. The batch was dropped at t=5 min when temperature of the stock approached approximately 160° C.

Remill stage: The master batch stock was remilled at essentially the same conditions of master batch. The remill stage is primarily used to improve mix between polymer and fillers.

The following components were added to the components mixed in the master-batch and remill stages. The components were mixed in the 300 g Brabender mixer at an agitation speed of 60 rpms, having an initial temperature of 75° C. The amounts are based on 100 parts rubber.

| Component | Amount |
|---|---|
| Sulfur[1] | 1.70 |
| N-(cyclohexylthio) phthalimide (retarder)[2] | 0.25 |
| Zinc oxide[3] | 2.50 |
| Cyclohexyl-benzothiazole sulfonamide (accelerator)[4] | 1.50 |
| Diphenylguanidine[5] | 0.50 |

[1]Purchased from International Sulphur (Mt. Pleasant, TX)
[2]Purchased from Monsanto (St. Louis, MO) under the trade name Santogard PVI
[3]Purchased from Zinc Corp. America (Monaca, PA)
[4]Purchased from Monsanto (St. Louis, MO)
[5]Purchased from Monsanto (St. Louis, MO)

Final batch stage: At time zero, the master batch stock was added to the mixer, where the temperature was held at 75° C. The components were then charged at t=0.5 min. The final batch was dropped at t=1.3 minutes when temperature of the stock reached approximately 90° C.

Example 3: Partial Replacement Aromatic Oil

The rubber composition of Example 2 was prepared using the same components and the same procedure, except that only 15 parts aromatic oil was replaced with 15 parts polyisobutylene imide prepared in Example 1.

Example 4: Total Replacement of Aromatic Oil

The rubber composition of Example 2 was prepared using the same components and the same procedure, except that all 30 parts aromatic oil were replaced with 30 parts polyisobutylene imide prepared in Example 1.

Table 1 summarizes the experimental results from Examples 2-4:

TABLE 1

Analysis of Examples 2–4

| | Example 2 | Example 3 | Example 4 |
|---|---|---|---|
| Components | | | |
| Styrene-butadiene rubber (20% St) | 100 | 100 | 100 |
| Precipitated Silica | 70 | 70 | 70 |
| Aromatic oil | 30 | 15 | 0 |
| Polyisobutylene imide | 0 | 15 | 30 |
| Sulfur | 1.7 | 1.7 | 1.7 |
| Tests | | | |
| 130° C. Mooney viscosity | 57.7 | 56.1 | 55.3 |
| Carbon Black Dispersion Index | 98.5 | 98.9 | 97.1 |
| Shore A @ 22° C. (3 sec) | 57.5 | 63.1 | 64.0 |
| @ 100° C. (3 sec) | 52.2 | 57.3 | 58.1 |
| Ring Tensile @ 23° C. | | | |
| Tb (MPa) | 17.29 | 15.45 | 15.07 |
| Eb (%) | 610.2 | 544.1 | 523.4 |
| M300 | 6.36 | 6.31 | 6.82 |
| M50 | 0.98 | 1.01 | 1.16 |
| Tear Strength (kN/m) | 20.9 | 21.1 | 19.0 |

TABLE 1-continued

Analysis of Examples 2-4

|  | Example 2 | Example 3 | Example 4 |
|---|---|---|---|
| Ring Tear Travel (%) 170° C. | 398 | 402 | 373 |
| Tg of Compound (tanδ) | −39.2 | −39.7 | −43.1 |
| British Portable Skid Tester on Wet Concrete | 63 | 69 | 67 |
| tanδ @ 50° C. | 0.13322 | 0.11833 | 0.11204 |
| G'(Pa × $10^{-7}$) | 0.73503 | 0.94729 | 1.1215 |
| tanδ @ 25° C. | 0.14496 | 0.13462 | 0.12756 |
| G' | 1.0132 | 1.2505 | 1.4848 |
| tanδ @ 0° C. | 0.16267 | 0.15658 | 0.14592 |
| G' | 1.5498 | 1.7961 | 2.0627 |
| tanδ @ −25° C. | 0.31591 | 0.29149 | 0.25805 |
| G' | 3.3665 | 3.4588 | 3.5867 |
| tanδ @ −50° C. | 0.17478 | 0.21805 | 0.34667 |
| G' | 101.030 | 92.304 | 66.306 |

As can be seen in Table 1, Examples 3 and 4, both run in accordance with the invention, exhibit improved sheer and wet-traction properties when compared to Example 2, the comparative example. In particular, Examples 3 and 4 have better values for the British Portable Skid Tester on Wet Concrete and have lower values for G' at −25° C., meaning that tires produced from the rubber compositions of Examples 3 and 4 have improved wet traction on water, ice, and snow surfaces. Additionally, Examples 3 and 4 have better values for the Theological properties (the tan δ and G') at 50° C., meaning that the rubber will have better handling properties (high G' at 50° C.) and a lower rolling resistance (low tan δ at 50° C.). While examples 3 and 4 exhibit the improved wet traction and sheer values, they also produce comparable data on parameters such as hardness of the material, evaluated by the Shore A test. In this test, run at both 22° C. and 100° C., the values from Examples 3 and 4 were comparable with those of Example 2, demonstrating that the rubber compositions of Examples 3 and 4 have acceptable hardness properties.

Example 5 (Comparative Example)

The rubber composition of Example 2 was prepared using the same components and the same procedure, except that 30 parts aromatic oil were replaced with 30 parts conventional liquid isobutylene polymer, an unfunctionalized, low molecular weight polyisobutylene (purchased from Elements Specialties in Belleville, N.J. under the trade name Kalene 800). Unlike the low molecular weight, functionalized polymer used in Example 4, the unfunctionalized, low molecular weight polymer failed to produce a stable rubber composition, with the unfunctionalized polymer bleeding to the surface. Additionally, the composition was unacceptably sticky.

Example 6 (Comparative Example)

The rubber composition of Example 2 was prepared using the same components and the same procedure, except that 30 parts aromatic oil were replaced with 30 parts conventional liquid butylene polymer, an unfunctionalized, low molecular weight polybutylene (purchased from Amoco in Chicago, Ill. under the trade name Indopol H-300). Unlike the low molecular weight, functionalized polymer used in Example 4, the unfunctionalized, low molecular weight polymer failed to produce a stable rubber composition. The unfunctionalized polymer bled to the surface, and the composition was unable to satisfactorily cure.

Example 7 (Comparative Example)

The rubber composition of Example 4 was prepared using the same components and the same procedure, except that 70 parts silica were replaced with 50 parts carbon black, an unfunctionalized filler (purchased from Columbia Chemical Company in Marietta, Ga. under the trade name N343). Because of the functionalized group of the polymer was not able to interact with the filler, the resulting composition was not stable, with the polymer bleeding to the surface after approximately one month of storage.

The foregoing description of embodiments is provided to enable any person skilled in the art to make or use embodiments of the present invention. Various modifications to these embodiments are possible, and the generic principles presented herein may be applied to other embodiments as well. As such, the present invention is not intended to be limited to the embodiments shown above but rather is to be accorded the widest scope consistent with the principles and novel features disclosed in any fashion herein.

What is claimed is:

1. A tread rubber composition, comprising:
   a. 100 phr of a rubber polymer or copolymer;
   b. silica;
   c. 10 to 30 phr of a functionalized polyisobutylene having a molecular weight of about 1,000 to about 50,000; and
   d. 0 to 30 phr of an aromatic oil;
   wherein said functionalized polyisobutylene is a reaction product of an anhydride-functionalized polyisobutylene and an amine having the formula $H_2N$—$(CH_2)_x$-A, wherein x is an integer ranging from 1 to 18 and A is an amino group;
   wherein the functionalized polyisobutylene contains functional groups at multiple points along the polymer backbone and is a liquid at 23° C.

2. The tread rubber composition of claim 1, wherein the functional group A is a secondary amino group and x ranges from 1-6.

3. The tread rubber composition of claim 2, wherein the amine having the formula $H_2N$—$(CH_2)$x-A is 3-(dimethylamino)propylamine.

4. The tread rubber composition of claim 3, wherein the functionalized polymer has a molecular weight of about 1,000 to about 5,000.

5. The tread rubber composition of claim 1, wherein the rubber polymer or copolymer is a styrene-butadiene rubber.

6. The tread rubber composition of claim 5, wherein the functional group A is a secondary amino group and x ranges from 1-6.

7. The tread rubber composition of claim 6, wherein the amine having the formula $H_2N$—$(CH_2)_x$-A is 3-(dimethylamino)propylamine.

8. The tread rubber composition of claim 7, wherein the functionalized polymer has a molecular weight of about 1,000 to about 5,000.

9. The tread rubber composition of claim 1, wherein the tread rubber composition further comprises no more than 15 phr of aromatic oil.

10. The tread rubber composition of claim 9, wherein the tread rubber composition comprises no aromatic oil.

11. A method of producing a tire having improved wet-traction properties, comprising:
   a. preparing a tread rubber composition comprising mixing:
      i. 100 phr of a rubber polymer or copolymer;
      ii. silica;

iii. 10 to 30 phr of a functionalized polyisobutylene having a molecular weight of about 1,000 to about 50,000; and iv. 0 to 30 phr of an aromatic oil;

b. vulcanizing the tread rubber composition to produce a tire having improved wet-traction properties;

wherein said functionalized polyisobutylene is a reaction product of an anhydride-functionalized polyisobutylene and an amine having the formula $H_2N—(CH_2)_x$-A, wherein x is an integer ranging from 1 to 18 and A is an amino group;

wherein the functionalized polyisobutylene contains functional groups at multiple points along the polymer backbone and is a liquid at 23° C.

12. The method of claim 11, wherein the functional group A is a secondary amino group and x ranges from 1-6.

13. The method of claim 12, wherein the amine having the formula $H_2N—(CH_2)_x$-A is 3-(dimethylamino)propylamine.

14. The method of claim 13, wherein the functionalized polymer has a molecular weight of about 1,000 to about 5,000.

15. The tread rubber composition of claim 11, wherein the rubber polymer or copolymer is a styrene-butadiene rubber.

16. The method of claim 15, wherein the functional group A is a secondary amino group and x ranges from 1-6.

17. The method of claim 16, wherein the amine having the formula $H_2N—(CH_2)_x$-A is 3-(dimethylamino)propylamine.

18. The method of claim 17, wherein the functionalized polymer has a molecular weight of about 1,000 to about 5,000.

19. The method of claim 11, wherein the tread rubber composition further comprises no more than 15 phr of aromatic oil.

20. The method of claim 19, wherein the tread rubber composition comprises no aromatic oil.

* * * * *